(12) United States Patent  
Saruta et al.

(10) Patent No.: US 9,245,199 B2  
(45) Date of Patent: Jan. 26, 2016

(54) IMAGE PROCESSING APPARATUS AND IMAGE PROCESSING METHOD (75) Inventors: Takayuki Saruta, Tokyo (JP); Yusuke Mitarai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 13/454,442

(22) Filed: Apr. 24, 2012

(65) Prior Publication Data

US 2012/0269392 A1 Oct. 25, 2012

(30) Foreign Application Priority Data

Apr. 25, 2011 (JP) ................................ 2011-097562

(51) Int. Cl.  
*G06K 9/00* (2006.01)  
*G06K 9/46* (2006.01)  
*G06K 9/62* (2006.01)  
*G06K 9/36* (2006.01)

(52) U.S. Cl.  
CPC ............ *G06K 9/4604* (2013.01); *G06K 9/6228* (2013.01); *G06K 2009/366* (2013.01)

(58) Field of Classification Search  
USPC ................................................. 382/103, 190  
See application file for complete search history.

(56) References Cited

U.S. PATENT DOCUMENTS

| | | | | |
|---|---|---|---|---|
| 5,680,481 A * | 10/1997 | Prasad | ............... | G06K 9/00281 382/118 |
| 6,895,112 B2 * | 5/2005 | Chen | .................. | G06K 9/0061 348/224.1 |
| 7,483,553 B2 * | 1/2009 | Xu | .......................... | G06T 11/00 345/473 |
| 7,577,297 B2 * | 8/2009 | Mori | ....................... | G06K 9/00 375/E7.084 |
| 7,689,008 B2 * | 3/2010 | Hammoud | ......... | G06K 9/00604 382/103 |
| 7,697,752 B2 * | 4/2010 | Li | ...................... | G06K 9/00248 382/103 |
| 7,916,903 B2 * | 3/2011 | Eura | .................. | G06K 9/00288 348/267 |
| 7,925,117 B2 * | 4/2011 | Hamza | .................. | G06T 7/0034 382/294 |
| 8,005,261 B2 * | 8/2011 | Baur | ...................... | G06K 9/325 382/103 |
| 8,015,130 B2 * | 9/2011 | Matsugu | ............ | G06K 9/00604 706/15 |
| 8,285,005 B2 * | 10/2012 | Hamza | ............... | G06K 9/00597 382/117 |
| 8,320,643 B2 * | 11/2012 | Nakanowatari | .... | G06K 9/00288 382/115 |

(Continued)

FOREIGN PATENT DOCUMENTS

| | | |
|---|---|---|
| JP | 08-069533 A | 3/1996 |
| JP | 2007-249280 A | 9/2007 |

(Continued)

OTHER PUBLICATIONS

Leibe, Robust Object Detection with Interleaved Categorization and Segmentation, Aug. 2007. Submission to the IJCV special issue on learning for visio and vision for learning.*

(Continued)

*Primary Examiner* — Chan Park  
*Assistant Examiner* — Iman K Kholdebarin  
(74) *Attorney, Agent, or Firm* — Carter, DeLuca, Farrell & Schmidt, LLP (57) ABSTRACT

A plurality of images obtained by capturing a recognition target object from different viewpoint positions is acquired, and a portion set on the recognition target object in the image is received as a set portion for each of the images. A plurality of feature points is set in each of the images so as to set a larger number of feature points at the set portion than at an unset portion other than the set portion. The recognition target object is learned using image feature amounts at the feature points.

12 Claims, 11 Drawing Sheets

(56) References Cited

U.S. PATENT DOCUMENTS

| | | | | |
|---|---|---|---|---|
| 8,355,530 B2* | 1/2013 | Park | G06K 9/00221 | 382/103 |
| 8,401,248 B1* | 3/2013 | Moon | G06Q 30/0242 | 382/103 |
| 8,675,098 B2* | 3/2014 | Ohashi | H04N 5/23219 | 348/169 |
| 8,929,614 B2* | 1/2015 | Oicherman | G06T 7/0046 | 382/115 |
| 2003/0053663 A1* | 3/2003 | Chen | G06K 9/00281 | 382/117 |
| 2003/0202105 A1* | 10/2003 | Gaubatz | G06K 9/0061 | 348/207.99 |
| 2004/0041924 A1* | 3/2004 | White | H04N 1/624 | 348/239 |
| 2004/0267682 A1* | 12/2004 | Baur | G06K 9/325 | 706/20 |
| 2005/0169520 A1* | 8/2005 | Chen | G06K 9/00234 | 382/165 |
| 2005/0207649 A1* | 9/2005 | Enomoto | G06K 9/00281 | 382/190 |
| 2005/0220347 A1* | 10/2005 | Enomoto | G06K 9/00248 | 382/190 |
| 2005/0234366 A1* | 10/2005 | Heinz | G10H 1/00 | 600/559 |
| 2007/0009180 A1* | 1/2007 | Huang | G06T 17/20 | 382/276 |
| 2007/0036438 A1* | 2/2007 | Thakur | G06K 9/0061 | 382/190 |
| 2007/0297696 A1* | 12/2007 | Hamza | G06T 7/0034 | 382/294 |
| 2008/0037838 A1* | 2/2008 | Ianculescu et al. | G06K 9/00228 | 382/118 |
| 2008/0151186 A1* | 6/2008 | Adachi | A61B 3/113 | 351/206 |
| 2008/0166052 A1* | 7/2008 | Hatano | G06K 9/00221 | 382/190 |
| 2008/0192980 A1* | 8/2008 | Park | G06K 9/00221 | 382/103 |
| 2008/0199044 A1* | 8/2008 | Tsurumi | G06T 7/2033 | 382/103 |
| 2008/0285825 A1* | 11/2008 | Zhang | G06K 9/342 | 382/128 |
| 2009/0103784 A1* | 4/2009 | Forutanpour | G06T 7/408 | 382/117 |
| 2010/0055654 A1* | 3/2010 | Yokono | G09B 19/00 | 434/155 |
| 2010/0104155 A1* | 4/2010 | Chen | G06T 7/0012 | 382/128 |
| 2010/0104197 A1* | 4/2010 | Sohma | G06F 17/30277 | 382/195 |
| 2010/0172577 A1* | 7/2010 | Matsushita | G06K 9/00281 | 382/165 |
| 2010/0177206 A1* | 7/2010 | Ogawa | G06K 9/00275 | 348/222.1 |
| 2010/0272365 A1* | 10/2010 | Yamamoto | G06K 9/00221 | 382/190 |
| 2011/0002544 A1* | 1/2011 | Oshima | G06K 9/6211 | 382/190 |
| 2011/0190633 A1* | 8/2011 | Kawagishi | A61B 8/08 | 600/443 |
| 2011/0234834 A1* | 9/2011 | Sugimoto | H04N 5/232 | 348/222.1 |
| 2011/0286628 A1* | 11/2011 | Goncalves | G06F 17/30256 | 382/103 |
| 2012/0093361 A1* | 4/2012 | Huang | G06T 7/208 | 382/103 |
| 2012/0106784 A1* | 5/2012 | Cho | G06T 7/2033 | 382/103 |
| 2012/0257791 A1* | 10/2012 | Woo | G06T 7/0085 | 382/103 |
| 2012/0269392 A1* | 10/2012 | Saruta | G06K 9/4604 | 382/103 |
| 2013/0004079 A1* | 1/2013 | Yamada | G06K 9/4642 | 382/190 |
| 2013/0142443 A1* | 6/2013 | Saruta | G06K 9/6807 | 382/224 |
| 2013/0170703 A1* | 7/2013 | Tsurumi | A63F 13/10 | 382/103 |
| 2014/0161346 A1* | 6/2014 | Ishiyama | G06T 7/0042 | 382/154 |

FOREIGN PATENT DOCUMENTS

| | | |
|---|---|---|
| JP | 2008-257649 A | 10/2008 |
| JP | 2009-037640 A | 2/2009 |

OTHER PUBLICATIONS

B. Leibe et al., "Robust Object Detection with Interleaved Categorization and Segmentation", IJCV Special Issue on Learning for Vision and Vision for Learning, Sep. 2005, 2nd revised version Aug. 2007.

H. Bay et al., "SURF: Speeded-Up Robust Features", Computing Vision and Image Understanding, vol. 110 (3) Jun. 2008, pp. 346-359.

E. Tola et al., "A Fast Local Descriptor for Dense Matching", CVPR 2008.

K. Mikolajczyk et al., "A Performance Evaluation of Local Descriptors", PAMI, 27(10) 2004, pp. 1615-1630.

Nagasaki et al., "A Coupon Classification Method Based on Adaptive Image Vector Matching", Technical Report of the Institute of Electronics, Information and Communication Engineers, Japan, vol. 105, No. 614, p. 19-24, Feb. 16, 2006.

Japanese Office Action issued in corresponding application No. 2011-097562 on Jan. 23, 2015.

* cited by examiner

IMAGE PROCESSING APPARATUS AND IMAGE PROCESSING METHOD

BACKGROUND OF THE INVENTION

1. Field of the Invention

The present invention relates to an image recognition technique.

2. Description of the Related Art

As one recognition technique, extensive studies have been made to cause a computer to learn a feature amount extracted from a target object image obtained by an image capturing unit and recognize the type of object in an input image. It has also been studied to estimate not only the type but also the position and orientation using object model information or the like. An application example of this technique is position/orientation recognition of parts to perform work such as advanced assembly by a robot.

Non-patent literature 1 (B. Leibe, "Robust Object Detection with. Interleaved Categorization and Segmentation", IJCV Special Issue on Learning for Vision for learning, August 2007) proposes a method of making a feature in a code book obtained from learned images correspond to a detected feature, and estimating the center position of an object by probabilistic voting (implicit-shape-model). This method can estimate not only the type but also the object position.

In patent literature 1 (Japanese Patent Laid-Open No. 2008-257649), a feature point is extracted from an input image, and its feature amount is calculated. A feature point having almost the same feature amount as that of a feature point in a learned image is set as a corresponding point. The reference point is voted for each corresponding point in the input image based on the feature amount (including position information) of a feature point in the learned image, thereby recognizing a target object and estimating its position.

However, the object recognition technique using an image takes a long processing time because a feature is extracted from an image and made to correspond to a feature obtained from a learned image. Further, not all features are useful for recognizing the target object.

In patent literature 2 (Japanese Patent Laid-Open No. 2009-37640), a partial region used for learning is sequentially changed in pattern recognition (character recognition). Every result obtained by recognizing a learning pattern is evaluated, selecting a plurality of partial regions used for learning.

For some recognition target objects, a portion useful for identifying the type, position, and orientation of a target object is known in advance. For example, when the type, position, and orientation of a part are to be recognized in automatic assembly by a robot and part of a rotationally symmetrical member has a notch, the orientation can be determined uniquely by recognizing the notch. However, it is generally difficult to efficiently learn and recognize the notch of the part.

However, patent literature 1 does not describe a method for defining feature points used for learning. When the method in patent literature 2 is applied, selection of a partial region takes a very long time because a learning pattern is recognized and evaluated every time a partial region is added.

SUMMARY OF THE INVENTION

The present invention has been made to solve the above problems, and provides a technique for efficiently learning a portion useful for identifying a recognition target object.

According to the first aspect of the present invention, an image processing apparatus comprising: an acquisition unit that acquires an image of a recognition target object; a reception unit that receives, as a set portion in the image, a portion useful for recognition of the recognition target object; and a learning unit that learns the recognition target object in the image using an image feature amount at a feature point at the set portion more significantly than an image feature amount at a feature point at an unset portion other than the set portion.

According to the second aspect of the present invention, an image processing method which is performed by an image processing apparatus, comprising: an acquisition step of acquiring an image of a recognition target object; a reception step of receiving, as a set portion in the image, a portion useful for recognition of the recognition target object; and a learning step of learning the recognition target object in the image using an image feature amount at a feature point at the set portion more significantly than an image feature amount at a feature point at an unset portion other than the set portion.

Further features of the present invention will become apparent from the following description of exemplary embodiments with reference to the attached drawings.

DESCRIPTION OF THE EMBODIMENTS

Embodiments of the present invention will now be described with reference to the accompanying drawings. Note that the following embodiments are merely examples of concretely practicing the present invention, and are detailed examples of arrangements defined in the scope of appended claims.

First Embodiment

Figure 1:
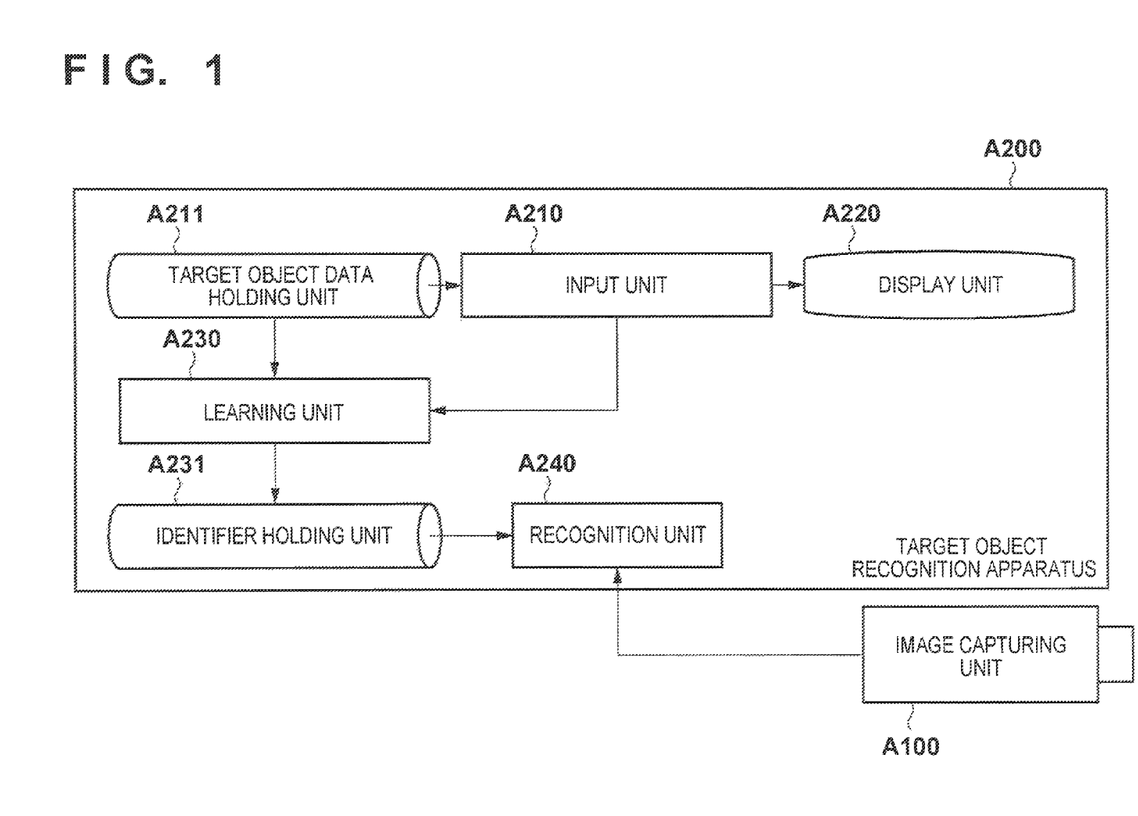
FIG. 1 is a block diagram exemplifying the functional arrangement of a recognition system.

The functional arrangement of a recognition system according to the first embodiment will be exemplified with reference to the block diagram of FIG. 1. As shown in FIG. 1, the recognition system includes an image capturing unit A100 which captures the image of an object to be recognized (recognition target object), and a target object recognition apparatus A200 (image processing apparatus) which recognizes the recognition target object using the image captured by the image capturing unit A100. Note that the image capturing unit A100 and target object recognition apparatus A200 may be separate apparatuses as shown in FIG. 1, or an integrated apparatus.

Figure 3:
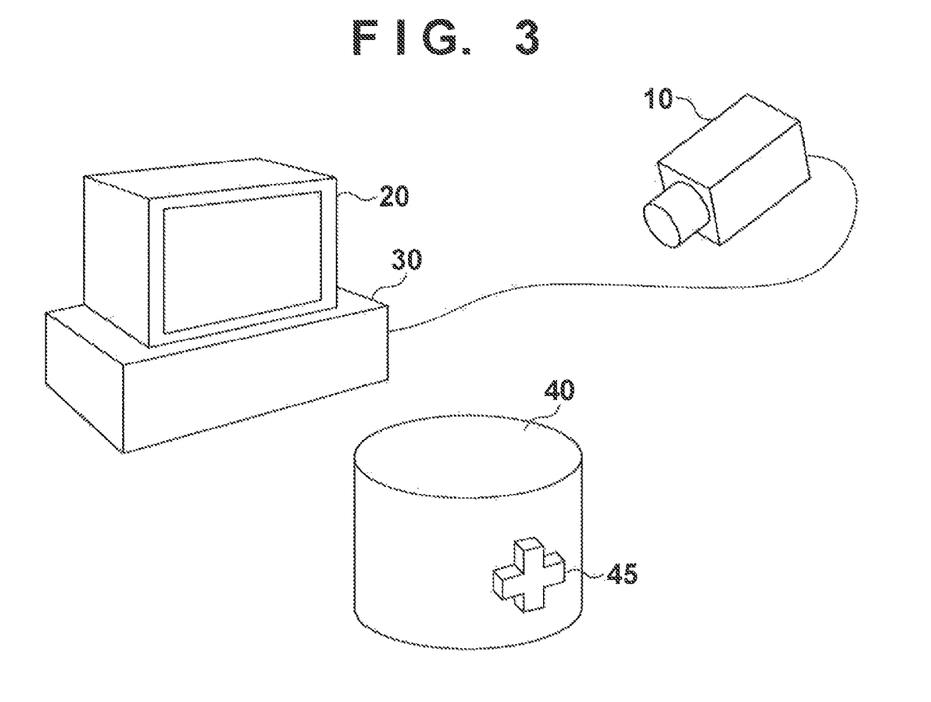
FIG. 3 is a view exemplifying the outer appearance of the recognition system.

FIG. 3 exemplifies the outer appearance of the recognition system according to the embodiment. Referring to FIG. 3, a camera 10 corresponds to the image capturing unit A100, and is used to capture a recognition target object 40 from different viewpoint positions and acquire a plurality of images. The recognition target object 40 has (on the recognition target object) a portion (useful portion) 45 useful for identifying the recognition target object 40. Images captured by the camera 10 are input to a computer main body 30.

The computer main body 30 includes a target object data holding unit A211, input unit A210, learning unit A230, identifier holding unit A231, and recognition unit A240 in FIG. 1. The computer main body 30 learns the recognition target object 40 using a plurality of images captured by the camera 10. When an image of the recognition target object 40 is newly captured after learning, the recognition target object 40 is recognized from this image.

Note that the target object data holding unit A211 and identifier holding unit A231 are implemented by a memory such as a hard disk or RAM. The input unit A210, learning unit A230, and recognition unit A240 may be implemented by hardware, or part or all of them may be implemented by software (computer programs). In this case, the software is executed by a processor such as the CPU of the computer main body 30.

A monitor 20 corresponds to a display unit A220, is implemented by a CRT, liquid crystal screen, or the like, and displays the result of processing by the computer main body 30 using an image, text, or the like. Note that each of the target object data holding unit A211 and identifier holding unit A231 may be the external memory of the computer main body 30.

Figure 2:
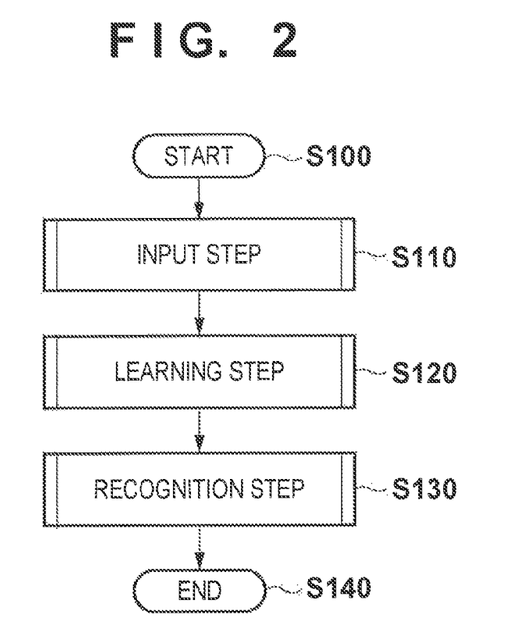
FIG. 2 is a flowchart showing processing to be performed by a target object recognition apparatus A200.
Figure 6:
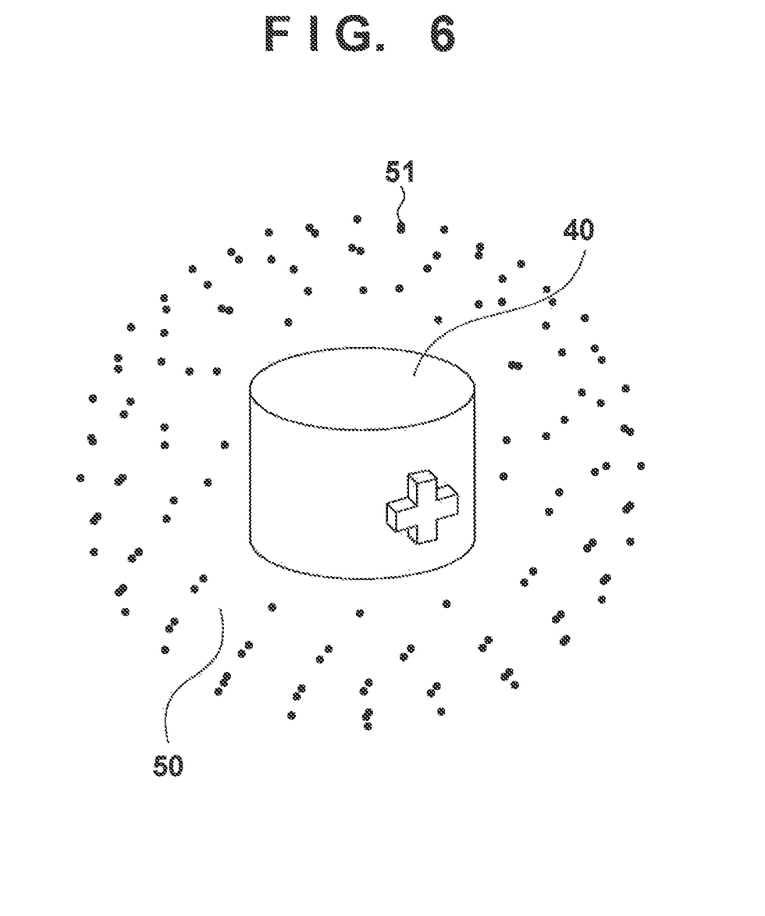
FIG. 6 is a view for explaining capturing of a plurality of images.

Next, processing to be performed by the target object recognition apparatus A200 will be explained with reference to FIG. 2 which is a flowchart showing this processing. Before executing processing according to the flowchart of FIG. 2, a plurality of images obtained by capturing a recognition target object from different viewpoint positions are stored in the target object data holding unit A211. For example, as shown in FIG. 6, a plurality of points 51 is set on a surface 50 of a sphere having the position of the recognition target object 40 as a center. The recognition target object 40 is captured from the positions of the respective points 51, and a plurality of captured images are stored in the target object data holding unit A211.

In step S110, the input unit A210 reads out one image (input image) from the target object data holding unit A211, and displays the readout input image on the display unit A220. Designation of a portion useful for identifying the recognition target object on the displayed input image is received from a user. Details of the processing in step S110 will be explained with reference to the flowchart of FIG. 5.

Figure 4:
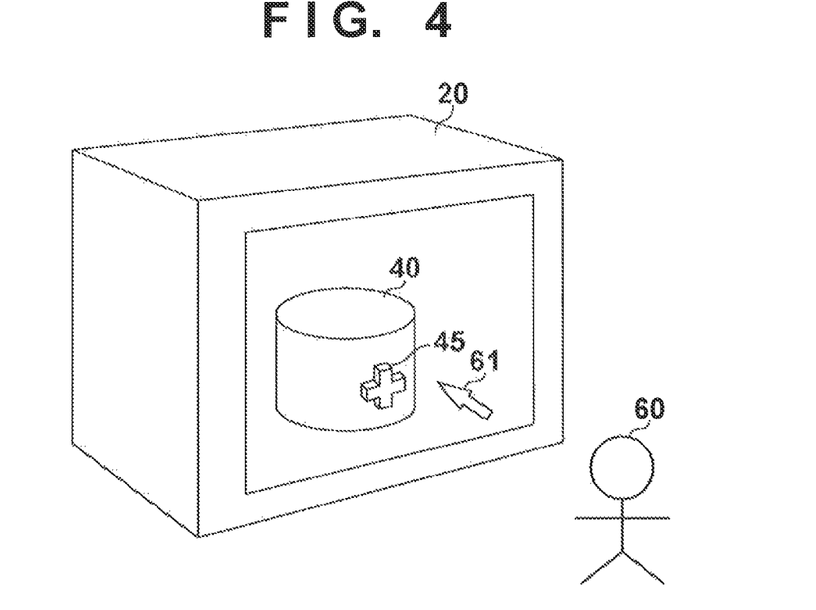
FIG. 4 is a view exemplifying display of an image on a display unit A220.

In step S111, the input unit A210 displays, on the display unit A220, an input image read out from the target object data holding unit A211. FIG. 4 exemplifies display of an image on the display unit A220. The display screen of the monitor 20 serving as the display unit A220 displays the image (input image) of the recognition target object 40 captured from a given viewpoint position. This input image exhibits the useful portion 45 of the recognition target object 40.

The user moves a cursor 61 to the useful portion 45 by operating, for example, the keyboard or mouse (not shown) of the target object recognition apparatus A200 in order to designate a portion (set portion) useful for identifying the recognition target object 40 displayed on the display screen, that is, the useful portion 45. It suffices to designate a frame region surrounding the useful portion 45 or the coordinates of part of the useful portion 45. The designation method is arbitrary as long as the useful portion 45 on the image can be specified in processing to be described later. Needless to say, designation of the useful portion 45 is not limited to designation by the user, and the target object recognition apparatus A200 may designate the useful portion 45 based on a predetermined standard. Also, a plurality of useful portions 45 may be designated, or a portion (unset portion) other than the useful portion 45 may be designated to adopt an undesignated portion as the useful portion 45.

Figure 5:
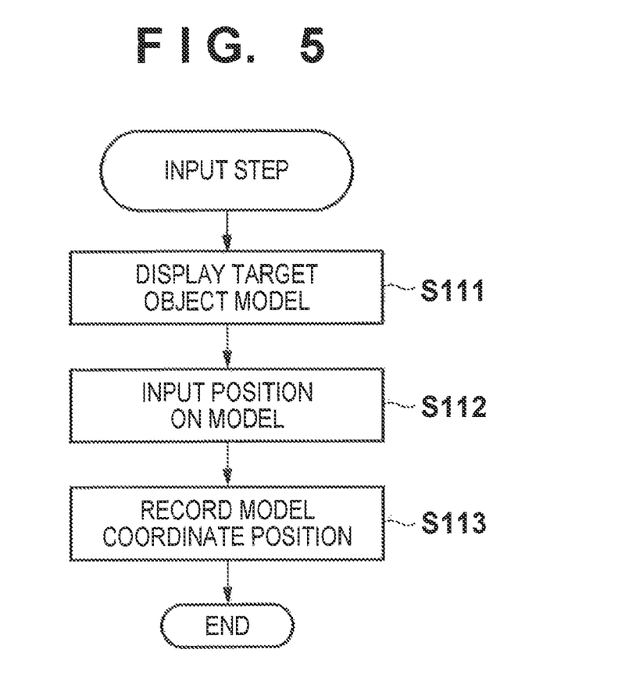
FIG. 5 is a flowchart showing details of processing in step S110.

In step S112, after receiving information (specifying information) which specifies the useful portion 45, the input unit A210 sends the received specifying information to the learning unit A230.

In step S120, the learning unit A230 sequentially reads out images saved in the target object data holding unit A211, and learns the recognition target object using the respective readout images and the specifying information input from the input unit A210. Recognition target object learning processing to be performed by the learning unit A230 will be explained with reference to FIG. 9 which is a flowchart showing this processing.

Although various known learning methods are applicable, the embodiment executes learning for voting-based recognition processing. In step S901, the learning unit A230 reads out one image (readout image) from the target object data holding unit A211, and specifies a region on the readout image that corresponds to a region indicated by specifying information, based on the position information, camera parameters, and the like of the image capturing unit A100 that has captured the readout image. That is, the learning unit A230 obtains the useful portion 45 on the readout image. It is also possible to designate a useful portion in advance for each image saved in the target object data holding unit A211, and save specifying information of each image in the target object data holding unit A211. In any case, the arrangement is arbitrary as long as the useful portion 45 on the readout image can be specified. After that, the learning unit A230 sets a plurality of feature points on the readout image. At this time, a larger number of feature points are set at the useful portion 45 than at an unuseful portion. For example, images shown in FIGS. 7A and 7B exhibit the useful portion 45, but an image shown in FIG. 7C does not exhibit the useful portion 45.

Figure 7A:
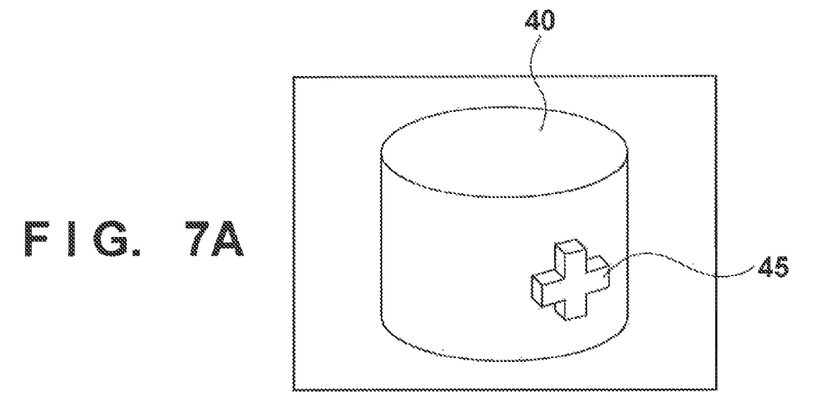
FIGS. 7A to 7C are views each showing an image of a recognition target object 40.
Figure 7B:
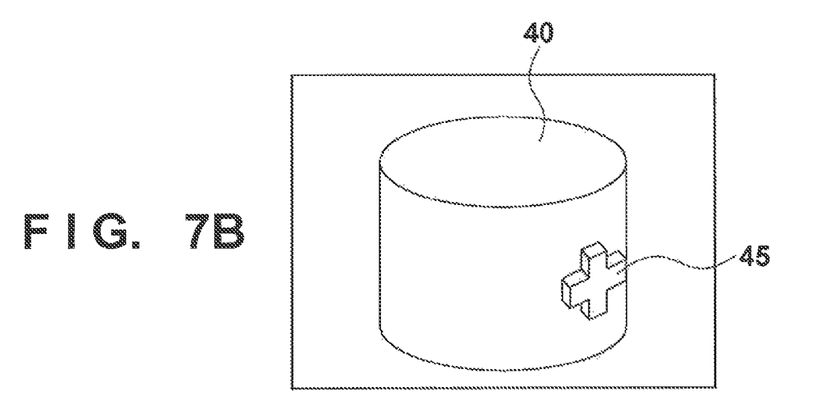
Figure 7C:
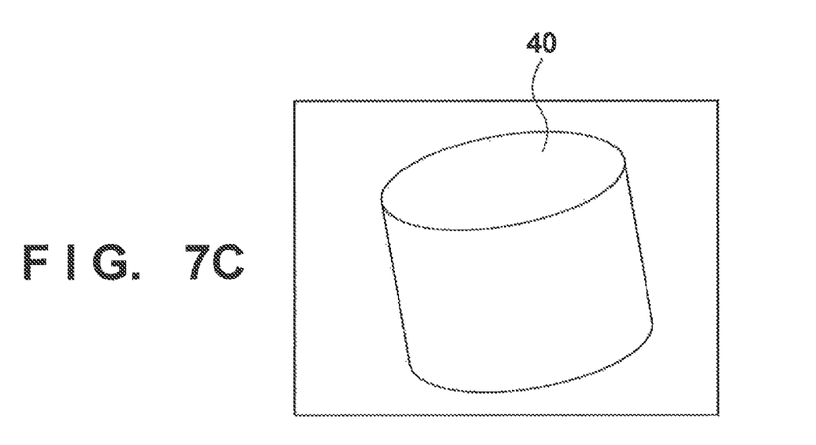
Figure 8A:
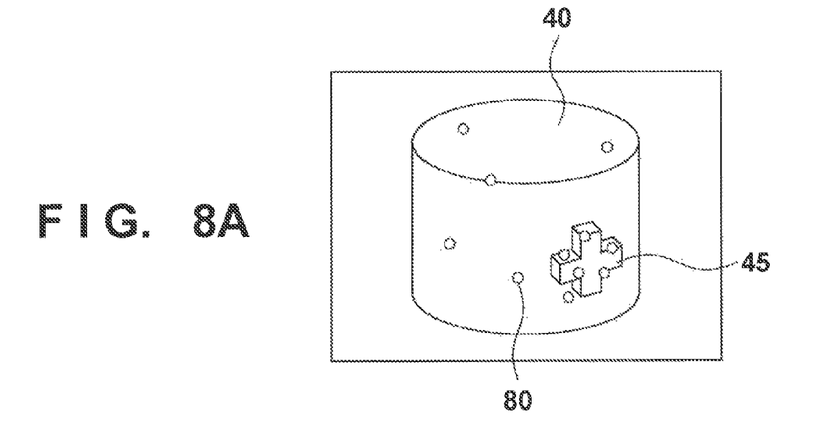
FIGS. 8A to 8C are views exemplifying setting of feature points.
Figure 8B:
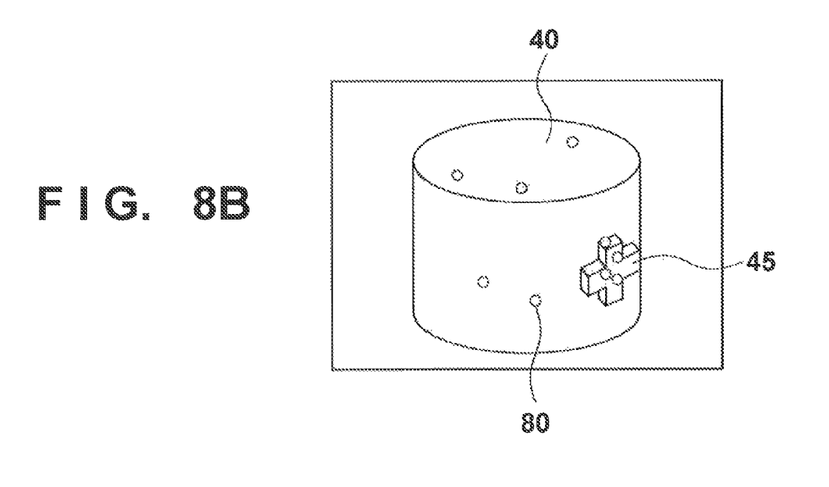
Figure 8C:
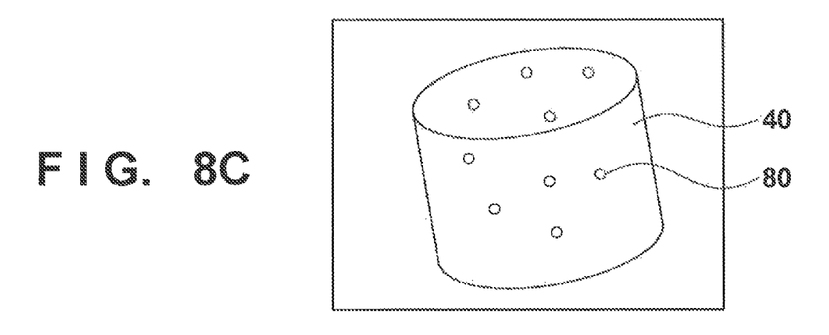

For images as shown in FIGS. 7A and 7B, a larger number of feature points 80 are set at the useful portion 45 than at an unuseful portion, as shown in FIGS. 8A and 8B. For example, when N (N≥2) feature points are set on one image, $\alpha N$ ($0.5 < \alpha < 1$) feature points may be set at the useful portion 45. In this case, a may be set in accordance with the area of the useful portion 45 on the image, or by the user with the keyboard, mouse, or the like. To the contrary, for an image as shown in FIG. 7C, the useful portion 45 does not exist on the image, so the feature points 80 are set uniformly on the entire image, as shown in FIG. 8C.

Figure 16A:
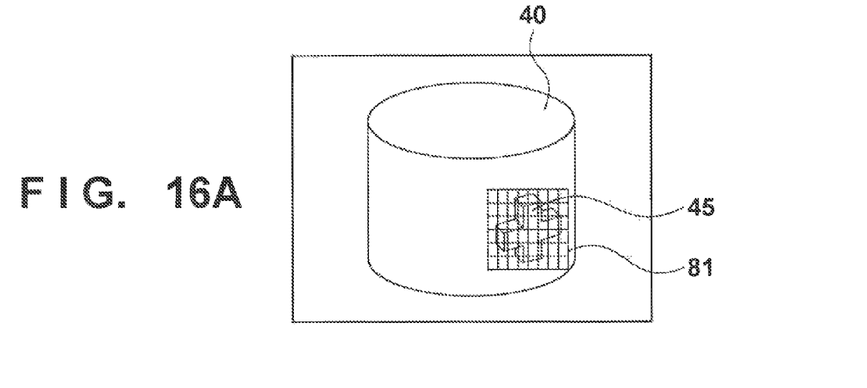
FIGS. 16A to 16C are views showing an example of acquiring feature points from a useful portion 45 uniformly.
Figure 16B:
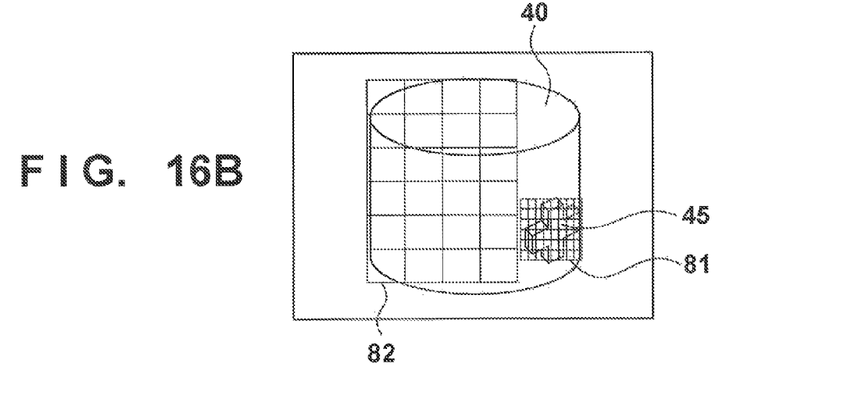
Figure 16C:
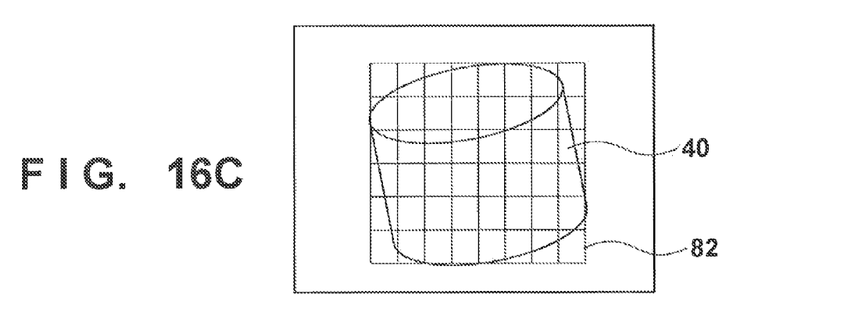

When acquiring feature points densely from an image without feature point detection, the sampling interval to acquire feature points is changed based on $\alpha$. Feature points may be acquired from a designated region uniformly. Alternatively, a Gaussian distribution or the like centered on a position indicated by specifying information may be defined to acquire feature points. FIGS. 16A to 16C show an example of acquiring feature points from the useful portion 45 uniformly. Feature points are sampled finely from a region as designated by a grid 81, and roughly from a region as designated by a grid 82.

Figure 9:
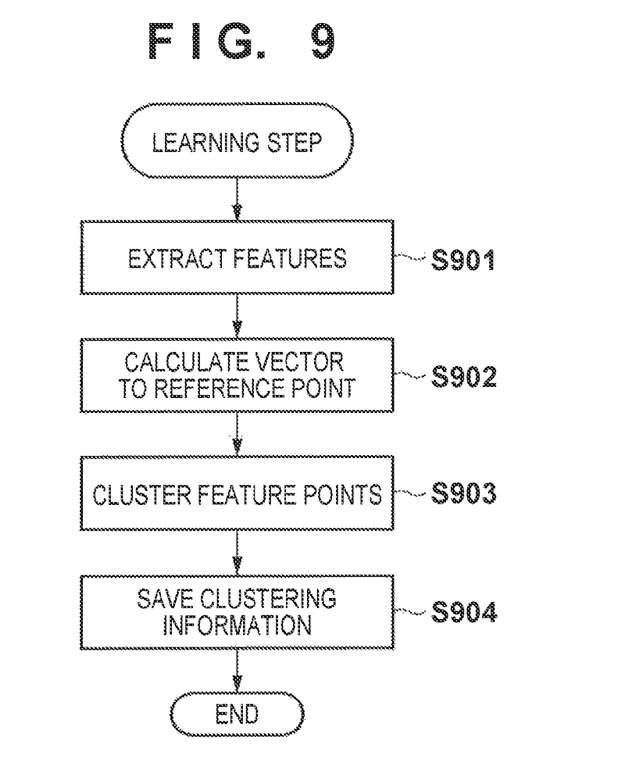
FIG. 9 is a flowchart showing recognition target object learning processing to be performed by a learning unit A230.

Then, the learning unit A230 extracts each set feature point and a feature amount (image feature amount) around the feature point. For example, information about a luminance gradient around an extracted feature point may be described, like SURF (literature X below). Feature points such as so-called Keypoints (literatures Y and Z below) are also available. Alternatively, image patches, edgelet, or the like are available.

Literature X: H. Bay, "Speeded-Up Robust Features (SURF)", Computing Vision and Image Understanding, Vol. 110 (3) June 2008, pp. 346-359.

Literature Y: E. Tola, "A Fast Local Descriptor for Dense Matching", CVPR 2008.

Literature Z: K. Mikolajczyk, "A Performance Evaluation of Local Descriptors", PAMI, 27(10) 2004, pp. 1615-1630.

Letting N be the total number of feature points set in an image, the i ($1 \leq i \leq N$)th feature point will be referred to as a feature point $f_i$, and the coordinate position of the feature point $f_i$ in the image will be referred to as $(x_i, y_i)$. The vector (feature amount vector) of a feature amount extracted for the feature point $f_i$ will be referred to as the feature amount vector $F_i$.

For each image, the coordinate positions and feature amounts of feature points may be collected in advance and stored in the target object data holding unit A211. That is, the processing in step S901 may be executed in advance. In this case, the learning unit A230 learns a recognition target object using these feature amounts stored in the target object data holding unit A211.

Learning processing by the learning unit A230 will be explained. The embodiment employs a learning method described in patent literature 1. More specifically, a learning method and recognition method in this literature are applied when a vector from each feature point to a reference point set in the region of a recognition target object within an image is obtained, and the reference point is voted in accordance with the feature amount correspondence to detect the class and position of the recognition target object. The voting space at this time is not particularly limited. Examples are a space defined by the x- and y-axes of image coordinates and an ID axis (class index representing a recognition target object), a space defined by the x- and y-axes of image coordinates and a scale s-axis, and the X-Y-Z space of the world coordinate axis. Instead of voting a reference point, probabilistic voting from each local feature to the center of a recognition target object is also available, such as implicit-shape-model (non-patent literature 1) described in Description of the Related Art.

In a multi-class problem, after voting all classes, a most voted class and position may be employed as recognition results, or all detection points equal to or larger than a preset threshold may be used as recognition results. In this case, feature points are extracted from an image, and a reference point is voted, and the type and position of a recognition target object are estimated.

In step S902, the learning unit A230 performs the following processing for each image saved in the target object data holding unit A211. First, the learning unit A230 obtains a vector $M_{ij}$ to a reference point $O_j$ (j=1, 2, 3, ...) set in advance in an image of interest from the feature point $f_i$ in the image of interest for all i and j.

Figure 10:
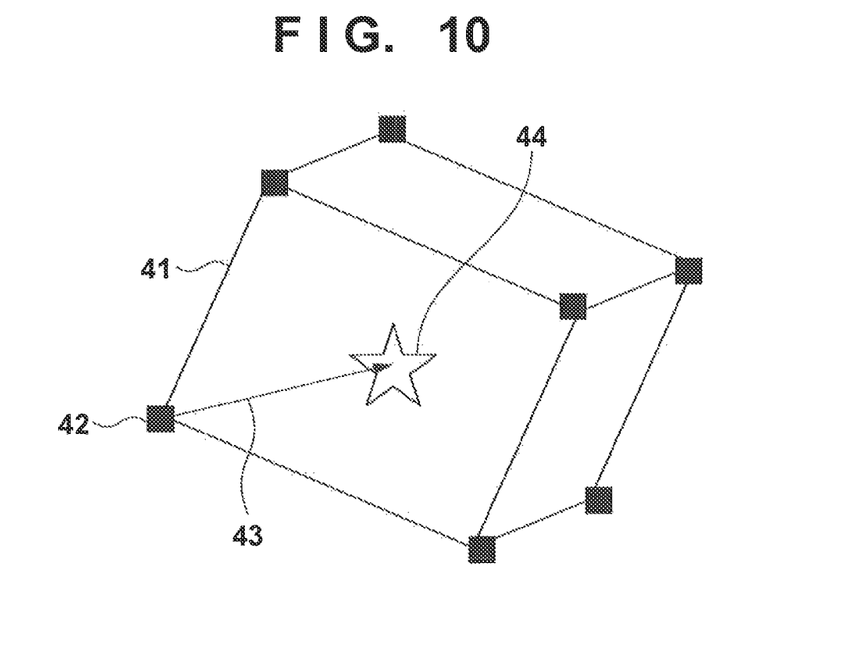
FIG. 10 is a view for explaining a method of obtaining a vector extending from a feature point to a reference point.

Assume that a reference point 44 is set in advance at the useful portion (star-shaped region in FIG. 10) of a recognition target object 41, and one of feature points set for the recognition target object 41 is a feature point 42, as shown in FIG. 10. In this case, a vector to be obtained for the feature point 42 is a vector 43 from the feature point 42 to the reference point 44. Letting $(x_n, y_n)$ be the coordinate position of the feature point 42 on the image and $(x_o, y_o)$ be that of the reference point on the image, the vector M to be obtained for the feature point 42 is $M=(x_o-x_n, y_o-y_n)$.

In step S903, the learning unit A230 clusters feature points $f_i$ obtained for all images saved in the target object data holding unit A211 by using the feature amount vectors $F_i$. This clustering can adopt an arbitrary clustering method such as k-means or self organizing map algorithm. For example, when k-means is used, a cluster count K is defined, and feature points $f_i$ can be clustered using the Euclidean distance between feature amount vectors. The feature points $f_i$ obtained for all images saved in the target object data holding unit A211 are clustered to corresponding cluster 1 to cluster K ($K \geq 2$).

In step S904, the learning unit A230 records the following pieces of information for each cluster k ($1 \leq k \leq K$) as clustering information for cluster k in the identifier holding unit A231:

identifier (for example, k) of cluster k representative feature amount vector $F_k'$ selected in accordance with a predetermined standard from the feature amount vectors $F_i$ of respective feature points $f_i$ clustered to cluster k coordinate positions $(x_i, y_i)$ of respective feature points $f_i$ clustered to cluster k vectors $M_{ij}$ to the reference point $O_j$ from respective feature points $f_i$ clustered to cluster k index $ID_i$ indicating the class of a recognition target object In step S130, when the image capturing unit A100 newly captures an image of the recognition target object, the recognition unit A240 recognizes the recognition target object in the captured image using clustering information (learning result) stored in the identifier holding unit A231. Details of the processing in step S130 will be explained with reference to FIG. 11 which is a flowchart showing this processing.

Figure 11:
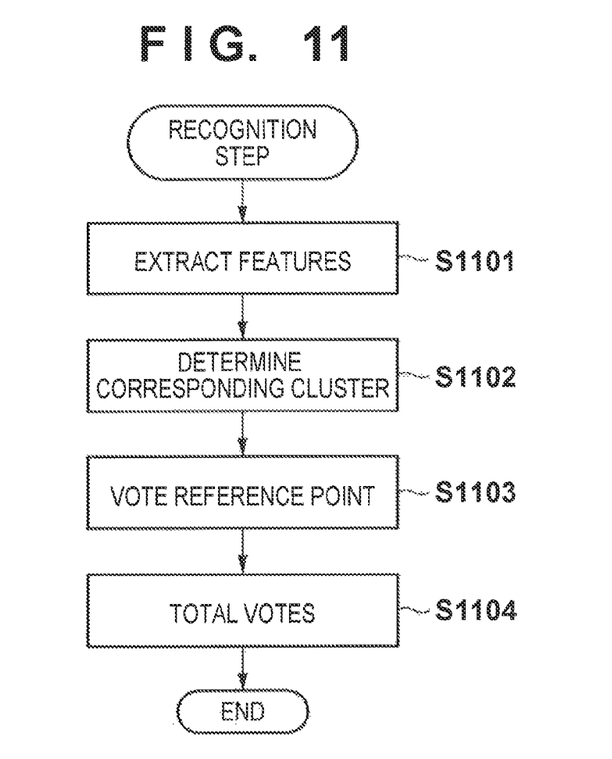
FIG. 11 is a flowchart showing details of processing in step S130.

In step S1101, the recognition unit A240 extracts feature amount vectors for respective feature points (M feature points in this case) from the image captured by the image capturing unit A100, similar to the learning unit A230. In step S1102, the recognition unit A240 obtains the distance between each extracted feature amount vector and each representative feature amount vector held in the identifier holding unit A231. The recognition unit A240 specifies, as a corresponding cluster, the cluster of a representative feature amount vector having a minimum distance (highest similarity).

Figure 12:
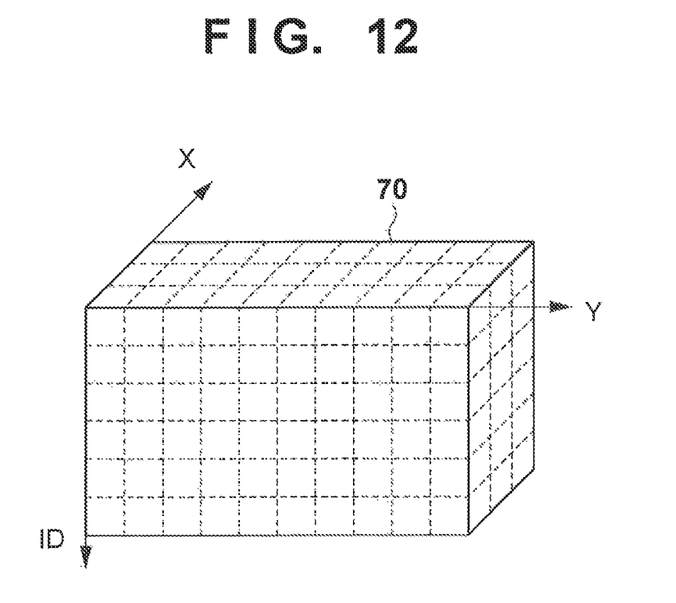
FIG. 12 is a view showing a voting space.

In step S1103, the recognition unit A240 refers to clustering information of the corresponding cluster and performs voting processing to be described later in a voting space 70 defined by three axes, that is, the x- and y-axes of image coordinates and an ID axis representing a class, as shown in FIG. 12. Assume that the size of each cell is set in advance.

The voting processing will be explained. The minimum distance (Euclidean distance) between a feature amount vector $g_m$ obtained for each feature point m (m=1, 2, 3, ..., M) extracted from a captured image, and the representative feature amount vector $F_k'$ of each cluster k can be calculated using equation (1):

$$k'' = \arg\min_{k}|g_m - F'_k| \qquad (1)$$

From equation (1), a cluster k" having a minimum distance can be specified as a corresponding cluster. Then, voting processing is executed using "vector $M_{ij}$ and index $ID_i$ for the feature point $f_i$" in clustering information of cluster k".

More specifically, letting (x, y, ID) be a voting point in the voting space, and $(x_m, y_m)$ be the coordinate position of each feature point in a captured image, a cell corresponding to the voting point (x, y, ID) that is obtained in accordance with equations (2) is voted:

$$(x,y)=(x_m,y_m)+M_{ij}$$

$$ID=ID_i \qquad (2)$$

In this case, the maximum total voting count is N×M.

In step S1104, the recognition unit A240 totals the voting results, and adopts a voting point having the largest voting count as the recognition result.

As described above, according to the first embodiment, a portion useful for identifying a recognition target object is designated in advance, so the recognition target object can be recognized at high precision. As described above, various modifications of the embodiment are conceivable, and the same effects as the above ones can be obtained regardless of an adopted modification.

Second Embodiment

The second embodiment is different from the first embodiment in only the processes in steps S120 and S130. Hence, a description of the same parts as those in the first embodiment will not be repeated, and only a difference from the first embodiment will be described.

In step S120 according to the first embodiment, a larger number of feature points are set at the useful portion 45 than at an unuseful portion. In step S120 according to the second embodiment, the feature of a useful portion can be mainly used by setting a larger weight value for feature points set at a useful portion 45 than that for feature points at an unuseful portion. This weight value is recorded in an identifier holding unit A231.

Figure 13:
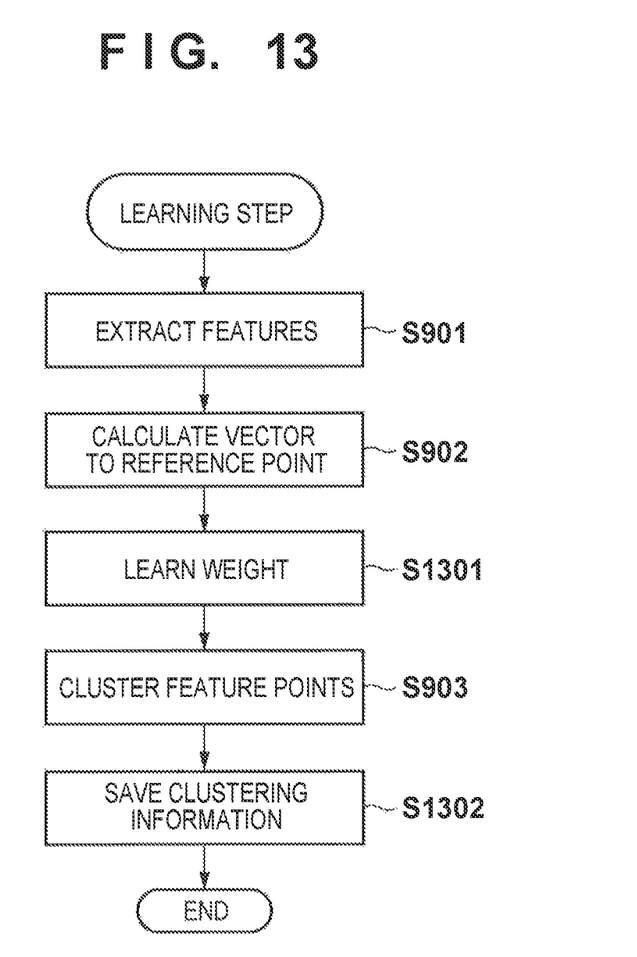
FIG. 13 is a flowchart showing details of processing in step S120.

Processing to be performed in step S120 in the second embodiment will be explained with reference to FIG. 13 which is a flowchart showing this processing. In FIG. 13, the same reference numerals as those in FIG. 9 denote the same steps, and a description of these steps will not be repeated.

In step S1301, a learning unit A230 performs the following processing for each image saved in a target object data holding unit A211. First, a weight value $W_i$ for the feature point $f_i$ in an image of interest is calculated according to equations (3):

$$W_i=\beta \text{ if } |f_i-p|<l$$

$$W_i=\gamma \text{ otherwise} \qquad (3)$$

where p is a vector indicating the position of the useful portion 45, $f_i$ is a vector indicating the coordinate position of the feature point $f_i$ on the image, and 1 is the threshold (predetermined distance). Further, $\beta>\gamma$. Calculation according to equations (3) can obtain the weight $W_i$ (=β or γ) for each feature point $f_i$. β and γ may be preset values, values designated by the user, or values determined by learning. When β and γ are determined by learning, they can be determined using calibration data, similar to a in the first embodiment.

When not the position of the useful portion 45 but the region of the useful portion 45 is designated in step S110, the weight value 14, is calculated according to equations (4) instead of equations (3):

$$W_i=\beta \text{ if } f_i \in R$$

$$W_i=\gamma \text{ otherwise} \qquad (4)$$

where R is the region of the useful portion 45. Alternatively, the weight value $W_i$ may be determined in accordance with a function using the coordinate position of the feature point $f_i$ on an image as a variable. For example, when this function uses a Gaussian function, the weight value $W_i$ may be calculated according to equations (5):

$$W_i=\beta \cdot g(f_i) \text{ if } |f_i-p|<1$$

$$W_i=\gamma \text{ otherwise} \qquad (5)$$

The Gaussian function can be represented by equation (6) using the standard deviation σ as a parameter:

$$g(x) = \frac{1}{2\pi\sigma}\exp\left(-\frac{|x-p|}{2\sigma^2}\right) \qquad (6)$$

Note that the standard deviation σ is determined in advance to satisfy equation (7):

$$\int g(x)=1 \qquad (7)$$

Even when feature points are detected densely from an image without feature point extraction, the weight value $W_i$ can be calculated similarly in accordance with one of equations (3) to (5). Similar to the first embodiment, it may be determined whether each image exhibits the useful portion 45.

In step S1302, the learning unit A230 records, in the identifier holding unit A231, the weight value $W_i$ of the feature point $f_i$ clustered to cluster k, in addition to pieces of information listed in the first embodiment as clustering information for cluster k.

Figure 14:
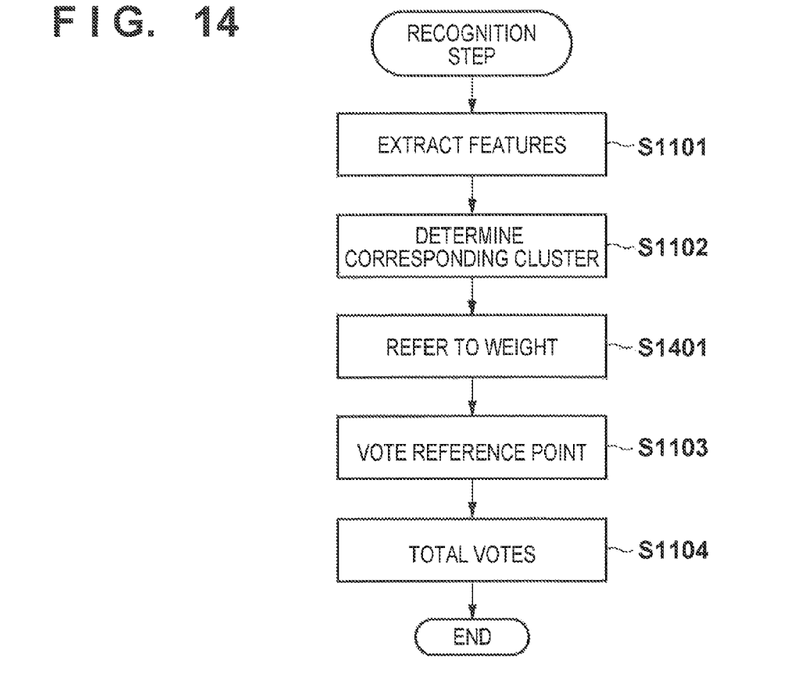
FIG. 14 is a flowchart showing details of processing in step S130.

In step S130, when an image capturing unit A100 acquires a newly captured image of the recognition target object, a recognition unit A240 performs processing of recognizing the recognition target object in the captured image using clustering information stored in the identifier holding unit A231. Details of the processing in step S130 will be explained with reference to FIG. 14 which is a flowchart showing this processing. In FIG. 14, the same reference numerals as those shown in FIG. 11 denote the same steps, and a description of these steps will not be repeated.

In step S1401, the recognition unit A240 refers to clustering information of each cluster stored in the identifier holding unit A231, and determines a weight in voting using the weight value $W_i$ in the referred clustering information.

Third Embodiment

The third embodiment is different from the first embodiment in only the processes in steps S110 and S120. A description of the same parts as those in the first embodiment will not be repeated, and only a difference from the first embodiment will be described.

Figure 15:
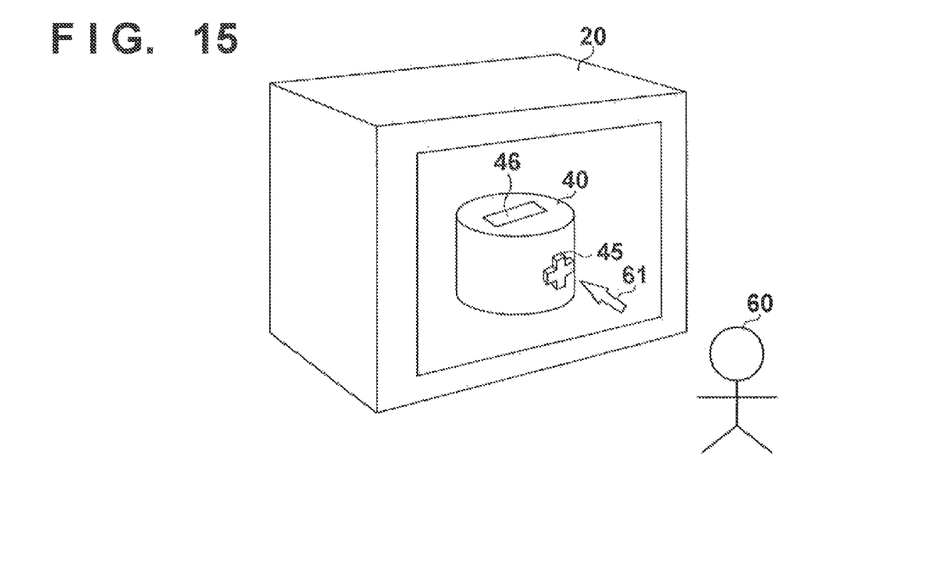
FIG. 15 is a view for explaining designation of an unuseful portion.

In step S110 according to the third embodiment, designation of a portion (unuseful portion) other than a useful portion is received. For example, when a recognition target object 40 has a portion 46 unuseful for identifying a recognition target object 40, as shown in FIG. 15, the position or region of the portion 46 is designated. Assume that the recognition target object 40 is a part. In some cases, a part bears a stamp such as a unique serial number, and the stamped information is not common to all parts. For this reason, the stamped portion cannot be used as a useful portion for learning to recognize various parts. In this case, a portion not serving as a useful portion is designated positively.

In step S120 according to the third embodiment, learning in the processing of step S120 described in the first embodiment is performed using feature points set in a region except for the unuseful portion designated in step S110.

That is, in the third embodiment, designation of a portion of interest out of unset portions is received, and the recognition target object is learned using image feature amounts at feature points set at portions except for the portion of interest. Although a portion unnecessary for identification is designated in the above-described embodiment, a portion useful for identification can be designated at the same time.

Fourth Embodiment

The fourth embodiment is different from the second embodiment in only the processes in steps S110 and S120. A description of the same parts as those in the second embodiment will not be repeated, and only a difference from the second embodiment will be described.

Also in step S110 according to the fourth embodiment, similar to the third embodiment, designation of a portion (unuseful portion) other than a useful portion is received. Step S120 in the fourth embodiment is basically the same as that in the second embodiment except for the method of calculating the weight value $W_i$. More specifically, letting p be the position of an unuseful portion, the weight value $W_i$ for a feature point $f_i$ at a position where the distance from the position p of the unuseful portion is smaller than the threshold 1 is set to 0, as represented by equations (8):

$$W_i = 0 \text{ if } |f_i - p| < l$$

$$W_i = \gamma \text{ otherwise} \quad (8)$$

Alternatively, the weight value $W_i$ may be determined according to a function using the coordinate position of the feature point $f_i$ on an image as a variable. For example, when this function uses a Gaussian function, the weight value $W_i$ may be calculated according to equations (9):

$$W_i = 1 - \beta \cdot g(f_i) \text{ if } |f_i - p| < l$$

$$W_i = \gamma \text{ otherwise} \quad (9)$$

The Gaussian function can be represented by equation (10) using the standard deviation σ as a parameter:

$$g(x) = \frac{1}{2\pi\sigma} \exp\left(-\frac{|x - p|}{2\sigma^2}\right) \quad (10)$$

Note that the standard deviation σ has been described in the second embodiment. Although a portion unnecessary for identification is designated in the fourth embodiment, similar to the third embodiment, a portion useful for identification can be designated at the same time.

Partial techniques in the above-described embodiments can also be combined appropriately, and the combination will readily occur to those skilled in the art. The recognition target object has been described as a real object in the embodiments, but may be a virtual object. In this case, the image capturing unit. A100 is implemented as a functional unit which captures the virtual object in a virtual space where the virtual object is arranged.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-097562 filed Apr. 25, 2011 which is hereby incorporated by reference herein in its entirety.

What is claimed is:

1. An image processing apparatus for generating a discriminator being used for recognizing a recognition target object, comprising:
    a processor; and
    a memory storing instructions that when executed cause the processor to function as:
        an acquisition unit configured to acquire an image including the recognition target object;
        a display control unit configured to cause a display unit to display the image including the recognition target object;
        a reception unit configured to receive, on the basis of an instruction for the recognition target object included in the image from a user, information indicating a partial portion of the recognition target object useful for recognition of the recognition target object;
        a setting unit configured to specify the partial portion of the recognition target object on the image according to the received information and set a plurality of feature points on both of the specified partial portion and a remaining portion in the image, so that a number of feature points at the specified partial portion is more than a number of feature points at the remaining portion, the remaining portion being a portion on the recognition target object other than the partial portion;
        an extraction unit configured to extract a plurality of feature amounts from a region including the feature points being set on the specified partial portion and the feature points being set on the remaining portion; and
        a generation unit configured to generate the discriminator for the recognition target object by clustering the plurality of feature points using the extracted feature amounts.

2. The apparatus according to claim 1, wherein the memory further includes instructions that when executed by the processor, cause the processor to further function as a unit configured to recognize the recognition target object in a newly captured image using the generated discriminator.

3. The apparatus according to claim 1, wherein the generation unit generates the discriminator by voting the partial portion with a weight value larger than at the remaining portion, and learns the recognition target object in accordance with a result of the voting.

4. The apparatus according to claim 1, wherein the memory further includes instructions that when executed by the processor, cause the processor to further function as a unit configured to receive designation of an unuseful portion not useful for recognition of the recognition target object at the remaining portion, and
wherein the generation unit generates the discriminator by learning the recognition target object using feature amounts at feature points respectively set at a portion other than the unuseful portion.

5. An image processing method for generating a discriminator being used for recognizing a recognition target object which is performed by an image processing apparatus, the method comprising:
acquiring an image including the recognition target object;
displaying the image including the recognition target object;
receiving, on the basis of an instruction for the recognition target object included in the image from a user, information indicating a partial portion of the recognition target object useful for recognition of the recognition target object;
specifying the partial portion of the recognition target object on the image according to the received information;
setting a plurality of feature points on both of the specified partial portion and a remaining portion in the image, so that a number of feature points at the specified partial portion is more than a number of feature points at the remaining portion, the remaining portion being a portion on the recognition target object other than the partial portion;
extracting a plurality of feature amounts from a region including the feature points being set on the specified partial portion and the feature points being set on the remaining portion; and
generating the discriminator for the recognition target object by clustering the plurality of feature points using the extracted feature amounts.

6. A non-transitory computer-readable storage medium storing a computer program for causing a computer to function as each unit of an image processing apparatus for generating a discriminator being used for recognizing a recognition target object, the image processing apparatus comprising:
an acquisition unit configured to acquire an image including the recognition target object;
a display control unit configured to cause a display unit to display the image including the recognition target object;
a reception unit configured to receive, on the basis of an instruction for the recognition target object included in the image from a user, information indicating a partial portion of the recognition target object useful for recognition of the recognition target object;
a setting unit configured to specify the partial portion of the recognition target object on the image according to the received information and set a plurality of feature points on both of the specified partial portion and a remaining portion in the image, so that a number of feature points at the specified partial portion is more than a number of feature points at the remaining portion, the remaining portion being a portion on the recognition target object other than the partial portion;
an extraction unit configured to extract a plurality of feature amounts from a region including the feature points being set on the specified partial portion and the feature points being set on the remaining portion; and
a generation unit configured to generate the discriminator for the recognition target object by clustering the plurality of feature points using the extracted feature amounts.

7. The apparatus according to claim 1, wherein the recognition target object included in the image acquired by the acquisition unit is a model of the recognition target object.

8. An image processing apparatus for generating a discriminator being used for recognizing a recognition target object, comprising:
a processor; and
a memory storing instructions that when executed cause the processor to function as:
an acquisition unit configured to acquire an image including the recognition target object;
a display control unit configured to cause a display unit to display the image including the recognition target object;
a reception unit configured to receive, on the basis of an instruction for the recognition target object included in the image from a user, information indicating a partial portion of the recognition target object useful for recognition of the recognition target object;
a setting unit configured to specify the partial portion of the recognition target object on the image according to the received information and set a plurality of feature points on both of the specified partial portion and a remaining portion in the image, the remaining portion being a portion on the recognition target object other than the partial portion;
a weight setting unit configured to set weight values to the plurality of feature points, so that weight values set to feature points at the specified partial portion is larger than weight values set to feature points at the remaining portion;
an extraction unit configured to extract a plurality of feature amounts from a region including the feature points being set on the specified partial portion and the feature points being set on the remaining portion; and
a generation unit configured to generate the discriminator for the recognition target object by clustering the plurality of feature points using the extracted feature amounts.

9. The apparatus according to claim 8, wherein the memory further includes instructions that when executed by the processor, cause the processor to further function as a unit configured to recognize the recognition target object in a newly captured image using the generated discriminator by voting the partial portion based on the weight values set to the plurality of feature points.

10. An image processing method for generating a discriminator being used for recognizing a recognition target object which is performed by an image processing apparatus, the method comprising:
acquiring an image including the recognition target object;
displaying the image including the recognition target object;
receiving, on the basis of an instruction for the recognition target object included in the image from a user, information indicating a partial portion of the recognition target object useful for recognition of the recognition target object;

specifying the partial portion of the recognition target object on the image according to the received information;

setting a plurality of feature points on both of the specified partial portion and a remaining portion in the image, the remaining portion being a portion on the recognition target object other than the partial portion;

setting weight values to the plurality of feature points, so that weight values set to feature points at the specified partial portion are larger than weight values set to feature points at the remaining portion;

extracting a plurality of feature amounts from a region including the feature points being set on the specified partial portion and the feature points being set on the remaining portion; and generating the discriminator for the recognition target object by clustering the plurality of feature points using the extracted feature amounts.

11. A non-transitory computer-readable storage medium storing a computer program for causing a computer to function as each unit of an image processing apparatus for generating a discriminator being used for recognizing a recognition target object, the image processing apparatus comprising:

an acquisition unit configured to acquire an image including the recognition target object;

a display control unit configured to cause a display unit to display the image including the recognition target object;

a reception unit configured to receive, on the basis of an instruction for the recognition target object included in the image from a user, information indicating a partial portion of the recognition target object useful for recognition of the recognition target object;

a setting unit configured to specify the partial portion of the recognition target object on the image according to the received information and set a plurality of feature points on both of the specified partial portion and a remaining portion in the image, the remaining portion being a portion on the recognition target object other than the partial portion;

a weight setting unit configured to set weight values to the plurality of feature points, so that weight values set to feature points at the specified partial portion is larger than weight values set to feature points at the remaining portion;

an extraction unit configured to extract a plurality of feature amounts from a region including the feature points being set on the specified partial portion and the feature points being set on the remaining portion; and a generation unit configured to generate the discriminator for the recognition target object by clustering the plurality of feature points using the extracted feature amounts.

12. The apparatus according to claim 1, wherein the setting unit determines the number of feature points to be set at the specified partial portion in accordance with an area of the partial portion on the image.

* * * * *